(12) United States Patent
Naylor et al.

(10) Patent No.: US 11,613,243 B2
(45) Date of Patent: Mar. 28, 2023

(54) VEHICLE CONTROL SYSTEM

(71) Applicant: Westinghouse Air Brake Technologies Corporation, Wilmerding, PA (US)

(72) Inventors: Michael A. Naylor, Brunswick, MD (US); Donald W. Gangemella, Montgomery Village, MD (US); Richard S. Klemanski, Walkersville, MD (US); Carl L. Haas, Walkersville, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 33 days.

(21) Appl. No.: 16/558,215

(22) Filed: Sep. 2, 2019

(65) Prior Publication Data

US 2020/0001857 A1 Jan. 2, 2020

Related U.S. Application Data

(63) Continuation-in-part of application No. 15/062,556, filed on Mar. 7, 2016, now Pat. No. 10,399,551.

(51) Int. Cl.
*B60W 40/12* (2012.01)
*B60W 10/30* (2006.01)
(Continued)

(52) U.S. Cl.
CPC ........ *B60W 10/30* (2013.01); *B60W 30/1886* (2013.01); *B60W 40/12* (2013.01);
(Continued)

(58) Field of Classification Search
CPC .......... B60W 10/30; B60W 2510/305; B60W 2300/145; B60W 40/12; B60W 30/1886; B61H 13/34
See application file for complete search history.

(56) References Cited

U.S. PATENT DOCUMENTS

| | | | |
|---|---|---|---|
| 5,975,162 A * | 11/1999 | Link, Jr. | ............... F17C 13/002 |
| | | | 141/192 |
| 6,624,760 B1 * | 9/2003 | Kinzel | ..................... H04Q 9/00 |
| | | | 340/539.1 |

(Continued)

OTHER PUBLICATIONS

Search Report dated Jun. 25, 2021 for corresponding Mexican Application No. MX / a / 2016/017313 (3 pages).
(Continued)

*Primary Examiner* — Mathew Franklin Gordon
(74) *Attorney, Agent, or Firm* — The Small Patent Law Group LLC; Christopher R. Carroll (57) ABSTRACT

A vehicle control system includes at least one sensor and a power supply control system. The sensor is on board a vehicle system and configured to generate vehicle data relating to a condition or parameter associated with the vehicle system. The power supply control system is configured to control one or more power supplies on board the vehicle system and to receive the vehicle data from the at least one sensor. The power supply control system is also configured to compare the vehicle data to one or more criteria relating to vehicle movement, and, in response to a determination that the vehicle data meets the criteria and receipt of a signal indicative of the vehicle system carrying (or being configured to carry) cargo of a predetermined material, generate a control signal to deactivate at least one of the power supplies.

20 Claims, 8 Drawing Sheets

(51) Int. Cl.
*B61H 13/34* (2006.01)
*B60W 30/188* (2012.01)

(52) U.S. Cl.
CPC ....... *B61H 13/34* (2013.01); *B60W 2300/145* (2013.01); *B60W 2510/305* (2013.01)

(56) References Cited

U.S. PATENT DOCUMENTS

| | | | |
|---|---|---|---|
| 2003/0205164 A1 | 11/2003 | Engle | |
| 2008/0149781 A1* | 6/2008 | Root | B60T 17/228 246/167 R |
| 2013/0340444 A1* | 12/2013 | Bryant | B60H 1/00964 62/62 |
| 2014/0252174 A1* | 9/2014 | Melas | B61C 17/12 246/187 A |
| 2015/0158507 A1* | 6/2015 | Flamanc | B61F 9/005 104/242 |
| 2016/0325767 A1* | 11/2016 | LeFebvre | B61L 25/021 |
| 2017/0129511 A1* | 5/2017 | Crane | B61L 27/0094 |

OTHER PUBLICATIONS

English Translation Search Report dated Jun. 25, 2021 for corresponding Mexican Application No. MX/a/2016/017313 (3 pages).
Office Action dated Jan. 14, 2023 for Canadian Patent Application No. 2,948,517 (5 pages).

\* cited by examiner

VEHICLE CONTROL SYSTEM

CROSS-REFERENCE TO RELATED APPLICATIONS

This application is a continuation-in-part of U.S. application Ser. No. 15/062,556 filed Mar. 7, 2016, the disclosure of which is incorporated herein by reference in its entirety.

FIELD

Various embodiments relate to vehicles. Other embodiments relate to control systems for controlling equipment on board vehicles.

BACKGROUND

Certain vehicles may include power supplies for providing electrical power to one or more devices on board the vehicles. For example, some electric or hybrid vehicles may include on board energy storage devices (e.g., batteries) and power converters and related equipment for converting and supplying power from the energy storage devices to one or more traction motors. Other vehicles may include engines that generate electrical power, which is provided to one or more on board power supplies to power, for example, on board control units, communication devices, brake systems, engine operation devices (fuel pumps, spark plugs, valves, etc.), and so on. In certain operational situations of a vehicle, the presence of electricity in a circuit may be undesirable. Despite this, power supplies may be configured to remain active unless a vehicle is fully powered down in the normal course.

It may be desirable to have a system for vehicle control that differs from existing systems.

BRIEF DESCRIPTION

In an embodiment, a vehicle control system includes at least one sensor and a power supply control system. The sensor is on board a vehicle system and is configured to generate vehicle data relating to a condition or parameter associated with the vehicle system. The power supply control system is configured to control one or more power supplies on board the vehicle system and to receive the vehicle data from the at least one sensor. The power supply control system is also configured to compare the vehicle data to one or more criteria relating to vehicle movement, and, in response to a determination that the vehicle data meets the criteria and/or receipt of a signal indicative of the vehicle system carrying (or being configured to carry) cargo of a predetermined material, generate a control signal to deactivate at least one power supply of the one or more power supplies.

In an embodiment, a vehicle control system includes at least one sensor and a power supply control system. The sensor is on board a vehicle system and is configured to generate vehicle data relating to a condition or parameter associated with the vehicle system. The power supply control system is configured to control one or more power supplies on board the vehicle system and to receive the vehicle data from the at least one sensor. The power supply control system is also configured to compare the vehicle data to one or more criteria relating to vehicle movement, and, responsive to both receipt of a signal indicative of the vehicle system carrying cargo of a predetermined material and a determination that the vehicle data meets the criteria, generate a control signal to deactivate at least one power supply of the one or more power supplies. That is, the control signal is generated responsive to when both conditions (cargo and movement) are present.

In an embodiment, a vehicle control system includes plural sensors respectively on board plural vehicles of a vehicle system and configured to generate vehicle data relating to conditions or parameters associated with the plural vehicles. The vehicle control system also includes a power supply control system configured to control plural power supplies respectively on board the plural vehicles and to receive the vehicle data from the sensors. The power supply control system is further configured to compare the vehicle data to one or more criteria relating to vehicle movement, and, responsive to a determination that the vehicle data of a first vehicle of the plural vehicles meets the criteria, generate a control signal to deactivate at least one of the power supplies on board a second vehicle of the plural vehicles.

In an embodiment, a vehicle control system includes at least one power supply, at least one power supply controller, and at least one local controller. The power supply is positioned on board a vehicle system that is configured to provide electrical power over a bus that interconnects plural vehicles of the vehicle system. The power supply controller is positioned on board the vehicle system and is configured to control the at least one power supply. The local controller is positioned on board one or more of the plural vehicles and is configured to: communicate over the bus; receive or determine vehicle data comprising a condition or parameter associated with one or more of the plural vehicles; compare the vehicle data to one or more criteria relating to vehicle movement; and, responsive to the vehicle data meeting the one or more criteria and receipt of a first signal indicative of at least one of the vehicles carrying or being configured to carry cargo of a predetermined material, transmit a second signal to the power supply controller for the power supply controller to deactivate the electrical power supplied to one or more of the vehicles from the at least one power supply.

BRIEF DESCRIPTION OF THE DRAWINGS

Reference is now made briefly to the accompanying drawings, in which.

DETAILED DESCRIPTION

Embodiments of the invention relate to vehicle control systems that automatically deactivate one or more power supplies of a vehicle or vehicle system responsive to the detected or determined occurrence of one or more designated events or conditions, such as vehicle movement meeting designated criteria (e.g., indicative of a derailment, crash, or other designated movement event) and/or the vehicle or vehicle system carrying, or being configured to carry, cargo of a predetermined material. The power supply (ies) may be deactivated to reduce or eliminate instances of occurrence of one or more events, e.g., unintended events such as vehicle equipment igniting, unintentional fuel ignition, flammable cargo igniting, personnel unintentionally contacting electrically-live conductors, post-event propulsion system operation, and so on. In one aspect, thereby, a vehicle control system may include at least one sensor and a power supply control system on board a vehicle system having one or more vehicles. (The power supply control system may include one or more of a vehicle controller, a remote or primary power supply controller, a local or secondary power supply controller, etc.; here, 'remote' may refer to being on a different vehicle, and 'local' to on the same vehicle, and/or to two separate controllers on the same vehicle where one is associated with a sub-system and the other with multiple systems/sub-systems and/or overall system control.) Each sensor is configured to generate vehicle data relating to a condition or parameter associated with the vehicle system. For example, the condition or parameter may relate to vehicle movement, such as velocity and acceleration/deceleration, throttle/braking, position, attitude, and so on. The condition or parameter may alternatively or additionally relate to route or other external conditions of the vehicle, on board temperature(s) or pressures, current on board system operational modes (e.g., active or deactivated, propulsion versus park, etc.). The power supply control system is configured to control one or more power supplies on board the vehicle system and to receive the vehicle data from the at least one sensor. The power supply control system is also configured to compare the vehicle data to one or more criteria relating to vehicle movement, and, in response to a determination that the vehicle data meets the criteria and/or receipt of a signal indicative of the vehicle system carrying (or being configured to carry) cargo of a predetermined material, generate a control signal to deactivate at least one power supply of the one or more power supplies.

For example, the power supply control system may be configured to generate the control signal responsive to only a determination that the vehicle data meets the criteria. The criteria may be indicative of, for example, vehicle derailment, a vehicle tipping over, skidding, "spinning out," "jackknifing," or otherwise losing traction (above a designated threshold or in a designated manner), a vehicle crashing or otherwise encountering an external object above a designated force threshold, a vehicle deviating from a route or route surface in a defined (e.g., unintended) manner, a vehicle entering or exiting a designated geographical or geopolitical region, a vehicle operating during a time of day or during a designated time period, a vehicle entering a work zone, a vehicle coming within a designated threshold distance of a designated location or locations, etc. In another embodiment, the power supply control system is configured to generate the control signal responsive to both receipt of a signal indicative of the vehicle system carrying (or being configured to carry) cargo of a predetermined material, and the vehicle data meeting the criteria. That is, the control signal is generated responsive to if the vehicle system is carrying the cargo and if the vehicle data meets the criteria (i.e., both conditions must be present). "Predetermined" may refer to known or designated, in terms of type (i.e., type or category of material) and/or quantity of material and/or location of the material in the vehicle system. Examples include on board fuel above a threshold volume/amount, human passengers above a designated number, the presence or number of public passengers (i.e., transit passengers), the presence and/or amount of flammable cargo, the presence or amount of cargo that is subject to one or more government regulations relating to regulated (e.g., 'hazardous') cargo, the presence or amount of designated cargo that might interact with the external environment of the vehicle in an undesirable manner, etc.

The vehicle control system may include one or more sensors that are configured to detect the presence and/or amount of cargo of a predetermined material carried by the vehicle system, and generate the signal(s) indicative thereof. Examples include fuel gauges/sensors, cargo vehicle sensors (e.g., sensors inside a container for hauling cargo), weight sensors, chemical sensors, cameras or other optical sensors, electrical sensors, off-board/wayside sensors that detect vehicle conditions (e.g., weight, temperature, constituents of on board cargo, video or other camera or other optical sensors that generate image data of cargo vehicles), and so on. Alternatively or additionally, the vehicle control system may include a processor that is configured to generate the signal (indicative of the vehicle system carrying cargo of a predetermined material) based on a vehicle manifest (of what type/category and number of cargo-carrying vehicles a vehicle system includes) and an acceleration curve of the vehicle system responsive to a designated propulsive effort. That is, if a vehicle system includes a known number of cargo-carrying vehicles that would have a minimum given or approximate mass if at least some of the vehicles are carrying cargo, then the processor can determine this state/condition (that at least some of the vehicles are carrying cargo) if the vehicle system responds to a known level or amount of tractive effort, in terms of acceleration (or other movement), within a designated envelope or threshold of an expected movement profile.

The vehicle control system may alternatively or additionally include a processor (e.g., as part of a vehicle controller or control unit) that is configured to generate the signal (indicative of the vehicle system carrying or being configured to carry cargo of a predetermined material, i.e., designated cargo) in relation to a vehicle manifest (e.g., stored in memory) that includes information of what cargo the vehicle system is carrying or is configured to carry. Such information may include a number and type/category of cargo-carrying vehicle, information on whether and/or to what extent such vehicles are currently carrying designated cargo, and/or information on the presence and/or amount of designated cargo irrespective of the number of vehicles that may be carrying the cargo. The processor may be configured to generate the signal when a vehicle system is activated for use, at the beginning of a trip of the vehicle system, when the processor is queried by another system, when changes to vehicle makeup and/or vehicle cargo occur, periodically or regularly in a designated manner, etc. One example is setting a data flag, as part of an operational set of program instructions of a processor, indicating the presence of designated cargo or designated cargo-carrying vehicles in a vehicle system, as discussed elsewhere herein.

As noted, the vehicle control system may be configured to deactivate a power supply (or supplies) based on a vehicle system including vehicle(s) that are configured for carrying designated cargo (i.e., cargo of a predetermined material), but without necessarily having information on hand of whether the vehicle system is currently carrying the cargo or an amount of such cargo. Examples include the presence of fuel tender vehicles (e.g., natural gas fuel tenders), the presence of oil or gasoline or other liquid fuel tankers, the presence of other cargo vehicles for carrying certain cargo that is subject to government regulations, etc.

The vehicle system includes one or more vehicles. Examples include automobiles, semi-trailer trucks, convoys or platoons of automobiles or semi-trailer trucks, individual rail vehicles (e.g., a locomotive), rail vehicle consists (e.g., trains) having one or more locomotives or other propulsion-generating rail vehicles and, in some instances, one or more non-propulsion generating vehicles (e.g., for carrying cargo), aircraft, marine vessels, mining haul trucks and other off-road mining, construction, or agriculture vehicles, autonomous vehicles, vehicles operated by human operators, etc. Plural vehicles of a vehicle system may be mechanically coupled and/or logically coupled (e.g., via wireless communications either directly or indirectly through a dispatch center or other remote location) to travel in coordination along a route.

According to one aspect, a vehicle system (having one or more vehicles) includes a braking system for slowing and stopping the vehicle system. The vehicle system may be a train or other rail vehicle consist, with the braking system including a pneumatically-driven brake arrangement (e.g., an "air brake" system) having mechanisms and components that interact with each rail vehicle of the consist. The air brake system for each rail vehicle may be configured to be controlled by an on-board controller (e.g., having a processor) and/or by an operator using an on-board controller or other control device, where the controller or control device is configured to transmit data and/or control signals over a trainline (e.g., a cable extending between the locomotives and other rail vehicles of a rail vehicle consist). The braking system may include an electronically-controlled pneumatic (ECP) air brake arrangement, which uses microprocessor and networking technologies to apply the brakes to each vehicle in a vehicle system (e.g., to each rail vehicle in a train or other rail vehicle consist) substantially simultaneously. The ECP-equipped trainline may be used both to communicate digital or other communication signals and to transmit system electrical power. The power for the trainline may be converted from one or more energy storage devices (and/or from another source of electrical power, such as an engine-driven generator/alternator) through a DC-to-DC converter and transmitted through the trainline to the devices on each rail vehicle. One example of a DC-to-DC converter is a 230 Volt DC trainline power supply, however other AC or DC voltages could be used. As set forth herein, a vehicle control system may be configured to In another aspect, vehicle systems may include other, different types of brake systems, which nevertheless utilize power supplies for braking control or other purposes. Still further, vehicle systems may include and utilize power supplies for purposes other than as part of a braking system. In any such cases (e.g., rail vehicle consists with ECP or other airbrake systems, rail vehicle consists with other braking systems that include power supplies, rail vehicle consists that include power supplies for other purposes, other vehicle systems that include power supplies for braking or other purposes), a vehicle control system may be configured to automatically deactivate the power supplies upon the occurrence of one or more designated events or conditions (e.g., relating to vehicle movement and/or vehicle cargo).

Figure 1A:
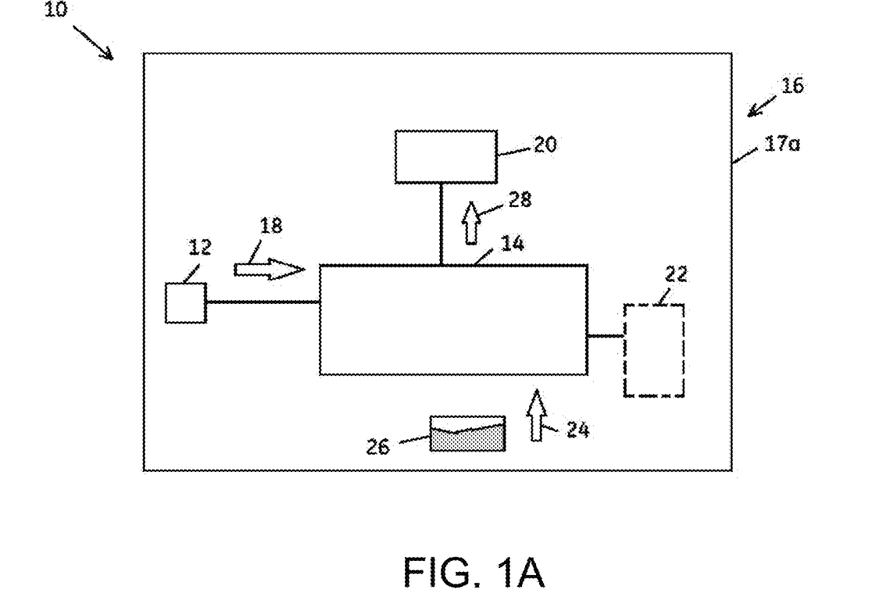
FIGS. 1A and 1B are schematic views of embodiments of a vehicle control system.

Turning now to FIG. 1A, in an embodiment, a vehicle control system 10 includes at least one sensor 12 and a power supply control system 14. The sensor is on board a vehicle system 16 (having a vehicle 17a) and is configured to generate vehicle data 18 relating to a condition or parameter associated with the vehicle system. The power supply control system is configured to control one or more power supplies 20 on board the vehicle system and to receive the vehicle data from the at least one sensor. The power supply control system is also configured to compare the vehicle data to one or more criteria 22 relating to vehicle movement, and, in response to a determination that the vehicle data meets the criteria and/or receipt of a signal 24 indicative of the vehicle system carrying (or being configured to carry) cargo of a predetermined material 26, generate a control signal 28 to deactivate at least one power supply of the one or more power supplies.

In another embodiment, the power supply control system is configured to generate the control signal responsive to both the vehicle data meeting the criteria and receipt of the cargo-related signal, that is, the control signal is generated responsive to both conditions being met. Receipt of the cargo-related signal may be approximately concurrent with assessing the vehicle data relevant to the criteria, e.g., a manifest may be accessed, a sensor may be polled, a data flag or other data structure may be accessed, a signal may be received from a periodic sensor output, etc. Alternatively or additionally, the system may be configured for the cargo-related signal to have been received during a designated, relevant time period (e.g., upon vehicle start-up or initialization, during a current trip of the vehicle, while the vehicle is traveling along a particular designated route segment, etc.)

Figure 1B:
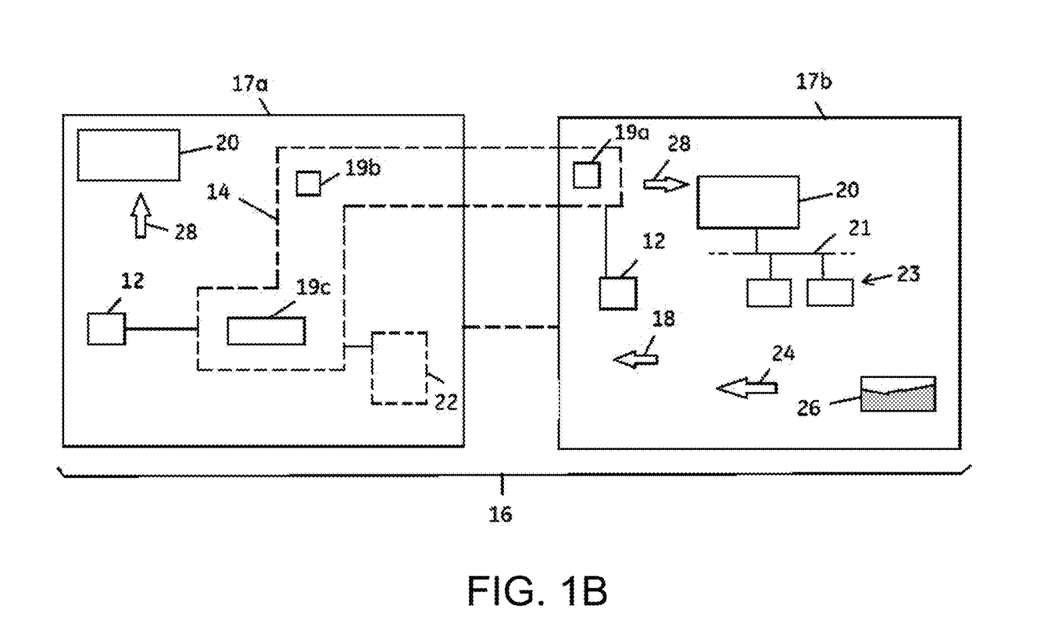

FIG. 1B illustrates an embodiment similar to that shown in FIG. 1A, but where the vehicle system 16 includes two vehicles 17a, 17b. Here, the vehicle control system may be configured to generate a signal to deactivate a power supply on one vehicle 17b based on determinations made on board another vehicle 17a, and/or based on vehicle data of the other vehicle 17a meeting designated criteria. For example, the vehicle control system may include plural sensors 12 respectively on board the plural vehicles 17a, 17b of the vehicle system and configured to generate vehicle data 18 relating to conditions or parameters associated with the plural vehicles. The vehicle control system also includes the power supply control system 14 (on one vehicle or multiple vehicles, e.g., the power supply control system may include or encompass a first processor or other circuit 19a on one vehicle, a different, second processor or other circuit 19b on another vehicle, and/or a vehicle movement control unit 19c, such as an engine throttle controller or an energy management system, that controls movement of the vehicle system for travel along a route) configured to control plural power supplies 20 respectively on board the plural vehicles and to receive the vehicle data from the sensors. (A power supply may provide electrical power over a bus 21, which comprises one or more conductors, to one or more electrical devices 23; the bus may be limited to one vehicle or may extend between vehicles.) The power supply control system is further configured to compare the vehicle data (e.g., of one or more of the vehicles) to the one or more criteria 22 relating to vehicle movement, and, responsive to a determination that the vehicle data of a first vehicle 17a or 17b of the plural vehicles meets the criteria, generate a control signal 28 to deactivate at least one of the power supplies on board a second vehicle (the other of 17a or 17b) of the plural vehicles. (Additional power supplies may also be deactivated, depending on the particular vehicle configuration.) In another aspect, the vehicle control system may also take cargo information into account, as discussed herein.

As further, more specific examples of the subject matter herein, FIGS. 2-8 show embodiments of vehicle control systems for rail vehicles (e.g., trains, other rail vehicle consists, locomotives, railcars (fuel tenders, tankers, boxcars, hoppers, flatbeds, autoracks, etc.), and so on) in the context of braking system power supplies. However, aspects of these embodiments are also applicable to other types of vehicles and other types of power supply systems.

Figure 2:
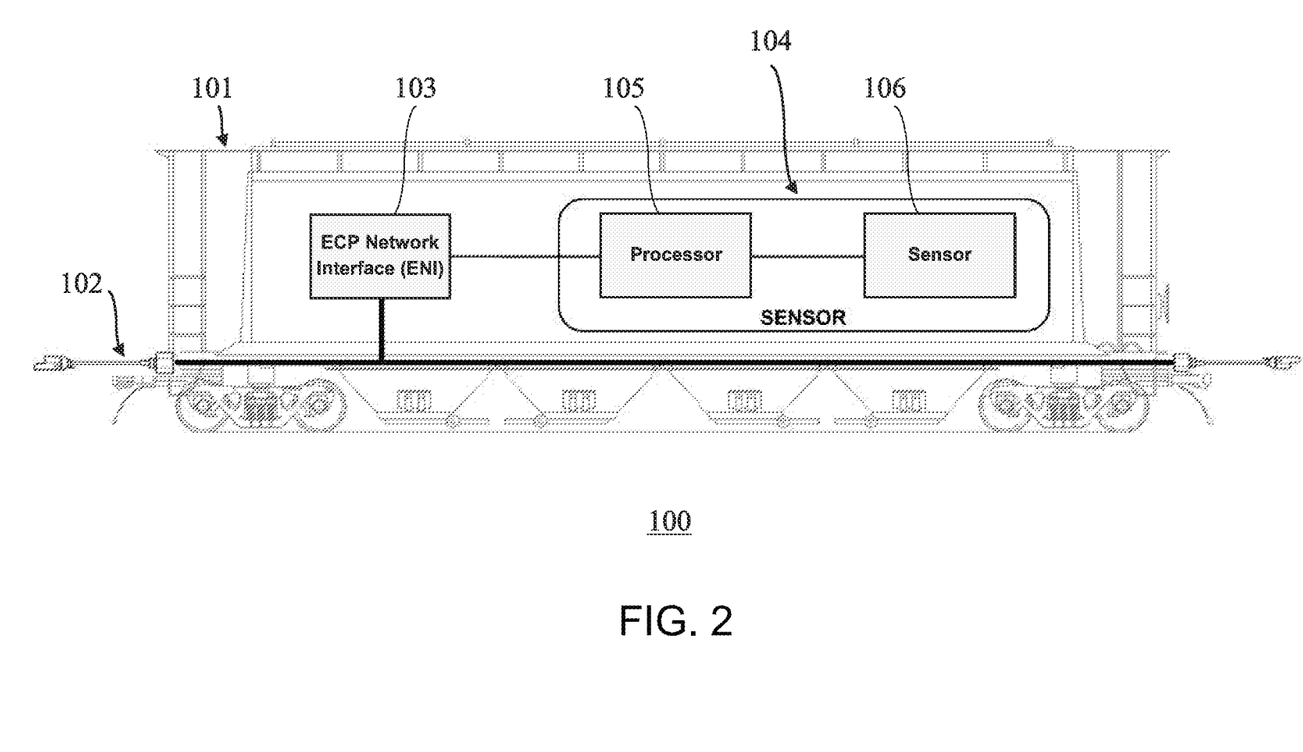
FIG. 2 is a schematic view of another embodiment of a vehicle control system.

FIG. 2 illustrates an embodiment of a vehicle control system 100 for an ECP-enabled rail vehicle 101. The rail vehicle 101 is connected to a trainline 102 which conducts data signals and system power. Connected to the trainline 102 is an ECP network interface ("ENI") 103, which communicates with the trainline 102 network or uses another communication protocol to communicate with other devices. The ENI comprises a processor or other computing device or other circuit that is programmed or otherwise configured to implement one or more of the processing or communication steps discussed herein. In this embodiment, connected to (or in direct or indirect communication with) the ENI 103 is a sensor unit 104 which may include, but is not limited to, a processor 105 and at least one sensor 106. The sensor 106 may be an accelerometer (to sense or determine acceleration in one or more directions), a flex sensor (to sense or determine the flexing of one or more components of the vehicle), a pressure sensor (to sense or determine a pressure component or parameter), a gyroscopic sensor (to sense or determine orientation, rotation, angular velocity, and/or tilt), a tilt sensor (to sense or determine orientation, rotation, angular velocity, and/or tilt), an ambient air temperature sensor (to sense or determine temperature external to the rail vehicle 101), a car payload temperature sensor (to sense or determine temperature internal to the rail vehicle 101), a vibration sensor, a magnetometer, and/or any other device for detecting potential or actual derailment (or other designated movement) of the rail vehicle 101. Further, the sensor or sensor unit may include a plurality of sensor devices for purposes of redundancy. One such system, method, and apparatus for detecting the varying acceleration of a rail vehicle is shown in U.S. Pat. No. 8,914,162 to Kernwein et al., entitled "System, Method, and Apparatus to Detect and Report Track Structure Defects", which is incorporated by reference herein in its entirety. More than one type of sensor 106 may be used, that is, a vehicle system may include plural different types of sensors that are configured to detect different aspects of vehicle movement or other conditions.

In an embodiment, the processor 105 directly or indirectly communicates with the sensor 106 and the ENI 103. The ENI 103 is programmed or otherwise configured to receive rail vehicle data including, but not limited to, a level of vibration, flexion, compression, angular velocity, speed, tilt, external temperature, internal temperature, or any combination thereof. The ENI 103 is configured to, based at least partially on the rail vehicle data, transmit control or command signals, e.g., messages, along the trainline 102 network, or through another communication protocol (e.g., over a wireless network), to deactivate all or specified vehicle power supplies. The sensor's 106 vehicle data may be transmitted additionally or alternatively to an on-board computer, e.g., a head end unit (HEU) 203, which may be located on a lead locomotive or other control vehicle, wherein the on-board computer is programmed or otherwise configured to deactivate all or specified train power supplies based at least partially on the rail vehicle data.

In an embodiment, the rail vehicle data may be transmitted to the on-board computer. The on-board computer may be programmed or otherwise configured to display or cause to display the rail vehicle data to the vehicle operator. One particular condition or parameter that may be of relevance to a locomotive operator would be external or internal rail vehicle 101 temperature. In the case of the temperature data surpassing a temperature threshold indicative of, e.g., train derailment, an alert may be announced to the locomotive operator. Any vehicle data discussed herein, including but not limited to temperature, may be broadcast to the operator or trigger an alert when surpassing a designated threshold condition or parameter. The alert may be visual, aural, tactile, or any other sensory alert that may draw the operator's attention to the situation at hand. The triggering of this alert may be synchronous with or independent of the on-board computer deactivating vehicle power supplies.

Figure 3:
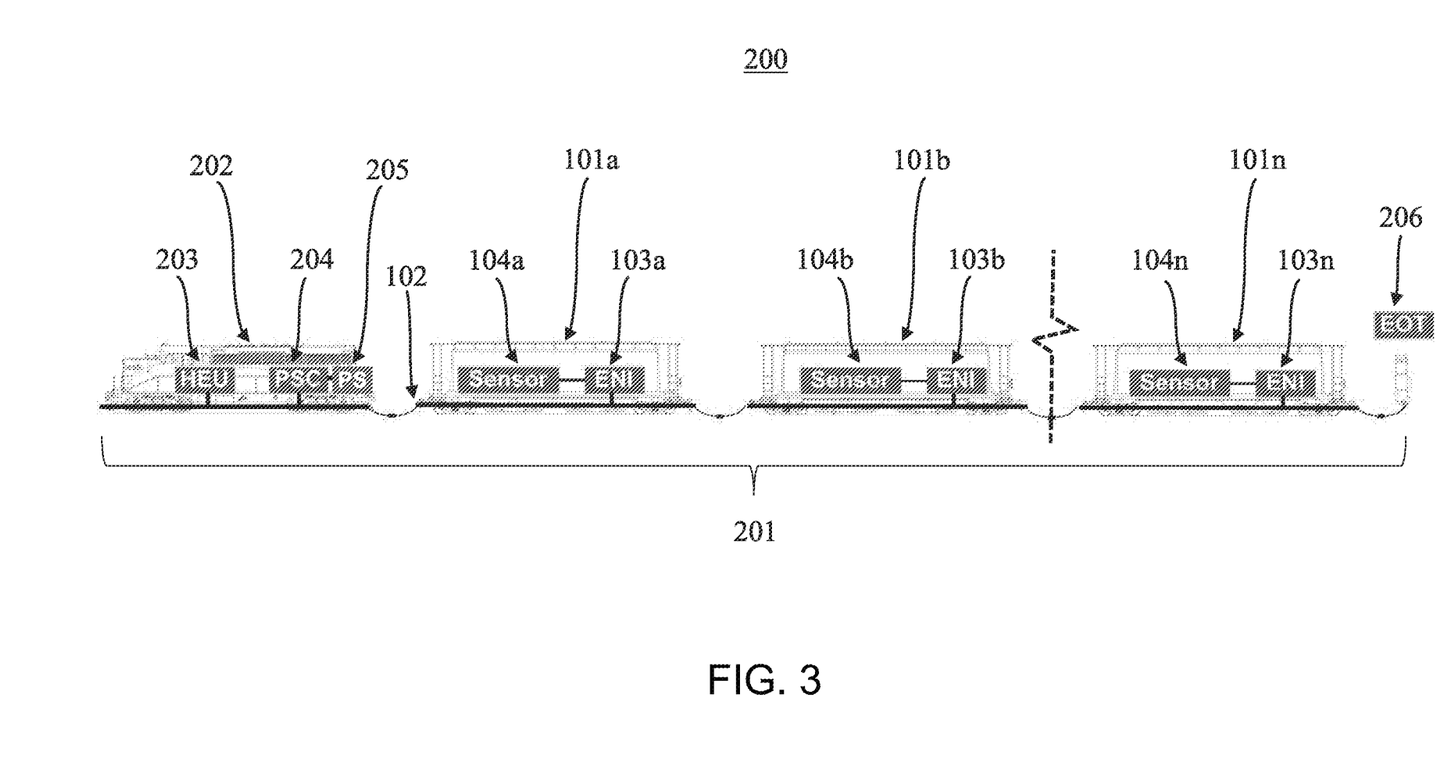
FIG. 3 is a schematic view of another embodiment of a vehicle control system.

FIG. 3 illustrates an embodiment of a vehicle control system 200 for a train 201 including a locomotive or other control vehicle 202 and a plurality of non-propulsion generating rail vehicles 101a-101n (e.g., tankers or other cargo railcars). The locomotive 202 and rail vehicles 101a-101n are connected to the trainline 102, such that data signals and power signals can be provided on and over the trainline 102. The locomotive 202 is equipped with at least an on-board computer 203 and a power supply controller 204, which is associated with a power supply 205 configured to deliver power to one or more of the components of the locomotive 202 and/or some or all of the rail vehicles 101a-101n. Some embodiments may include additional locomotives and/or other control vehicles which may contain additional power supply controllers and power supplies. The on-board computer 203 is programmed or otherwise configured to communicate with other train devices, components, and systems through the trainline 102 (or through another communications medium).

In an embodiment, the on-board computer 203 periodically transmits messages to the other train devices, including the power supply controller 204. For example, the message of the on-board computer 203 may contain a power state flag that is monitored by the power supply controller 204. In an embodiment, the power state variable may be a binary power state variable, but other data structures may be used, such as an object structure, a character variable, a string message, a list, a queue, an array, or any other like storage of data. After system startup, if the flag indicates an "on" state, the power supply controller 204 stays on. If the flag indicates an "off" state, the power supply controller 204 "turns off" or deactivates the power supply 205, thereby reducing the likelihood of electrical power from the power supply interacting undesirably with the external environment or otherwise.

The train 201 may also include an end-of-train device (EOT) 206, which may be connected to the trainline 102. The EOT 206 may be configured to monitor conditions at the end of the train 201 and provide rear-of-train 201 emergency braking capability. The EOT 206 may be configured in the same manner as the on-board computer 203 described above, in that it may be configured to communicate with other train devices, components, or systems via the trainline 102 or another communications protocol, transmit messages to other train devices, including the power supply controller 204, and instruct the power supply controller 204 or directly control the power supply 205 to deactivate the power supply 205.

With further reference to FIG. 3, in embodiments, each rail vehicle 101 is equipped with at least one ENI 103 and at least one sensor unit 104. However, some embodiments may include a train with only one rail vehicle 101 (such as only the last rail vehicle 101*n* having the EOT 206 thereon), or only some rail vehicles 101, equipped with at least one ENI 103 and at least one sensor unit 104. Each ENI 103 directly or indirectly communicates with the trainline 102 network or uses another communication protocol to communicate with other devices. Connected to each ENI 103 is at least one sensor unit 104, which may determine, sense, and/or processes rail vehicle data (e.g., sensed or determined data) associated with the rail vehicle 101. Each ENI 103 may be programmed or otherwise configured to receive rail vehicle data associated with the specified rail vehicle 101. Each ENI 103 may be further configured to, based at least partially on the rail vehicle data, transmit a message along the trainline 102 network, or by another communication protocol/medium (e.g., a radio or other wireless connection or the like), to cause the power supply controller 204 to deactivate its associated power supply 205. It may be the case that any rail vehicle 101 in the plurality of rail vehicles 101*a*-101*n* is capable of independently carrying out readings and transmitting messages.

Figure 4:
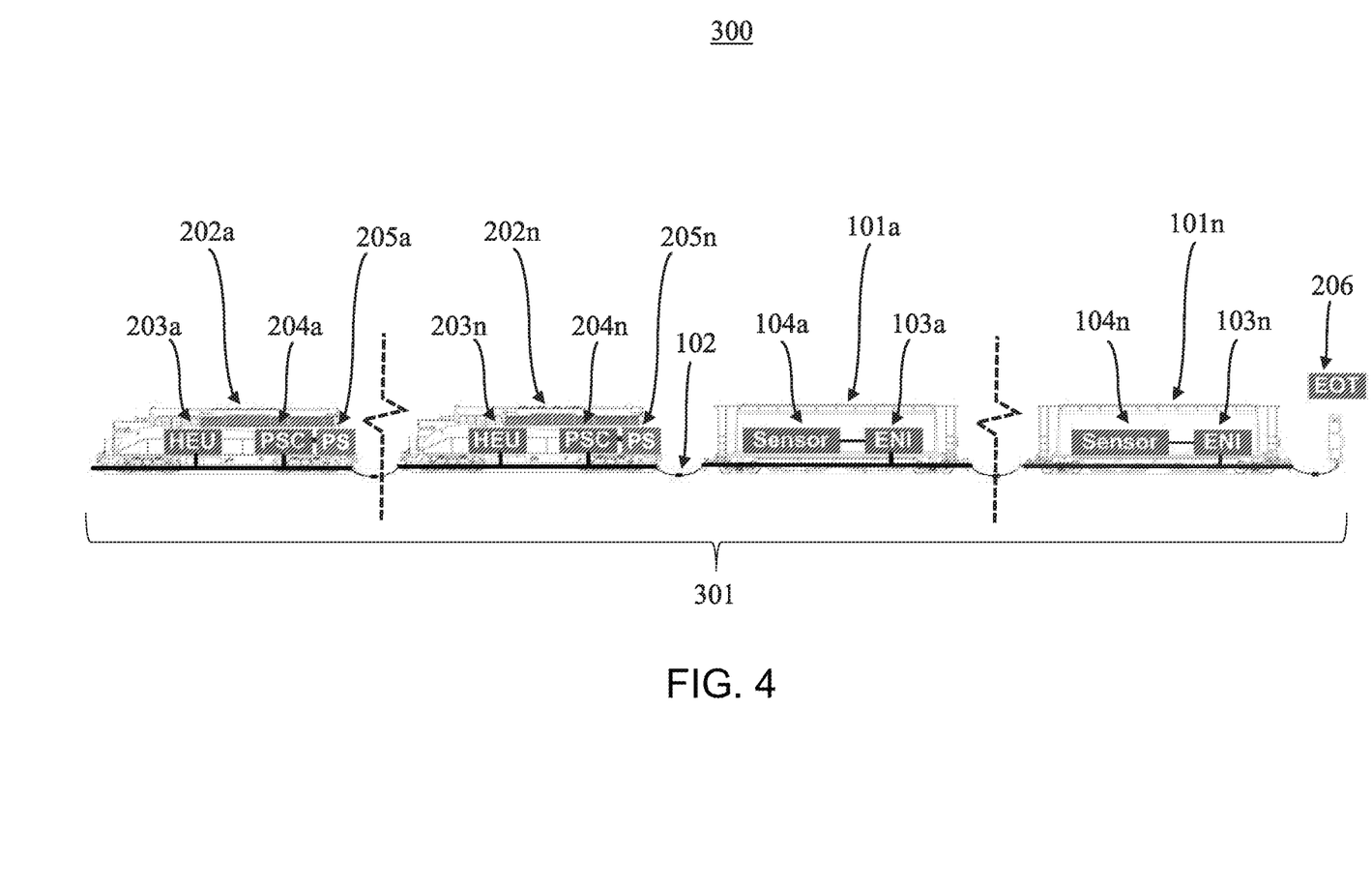
FIG. 4 is a schematic view of another embodiment of a vehicle control system.

FIG. 4 illustrates another embodiment of a vehicle control system 300 for a train 301 including a plurality of locomotives or other control cars 202*a*-202*n* and a plurality of non-propulsion generating rail vehicles 101*a*-101*n* (e.g., which may carry or be configured to carry cargo). The locomotives 202*a*-202*n* and rail vehicles 101*a*-101*n* are connected to the trainline 102, such that data signals and power signals can be provided on and over the trainline 102. The number of the locomotives 202 and rail vehicles 101 may vary, being as few as one of each type. Each locomotive 202 may be optionally equipped with at least one on-board computer 203 and at least one power supply controller 204, which is associated with at least one power supply 205 configured to deliver power to one or more of the components of the locomotive 202 and/or some or all of the rail vehicles 101*a*-101*n*. In this embodiment, there is an on-board computer, e.g., an HEU 203, a power supply controller 204, and a power supply 205 associated with each locomotive 202 and communicatively connected in the train 301 system. The on-board computer 203 is programmed or otherwise configured to communicate with other train devices, components, and systems through the trainline 102 (or through another communications protocol/medium).

With further reference to FIG. 4, each ENI 103 is programmed or otherwise configured to receive rail vehicle data including, but not limited to, a level of vibration, flexion, compression, speed, angular velocity, tilt, external temperature, internal temperature, or any combination thereof (or any other data point that, when compared to a threshold, is indicative of a rail vehicle derailment or other designated movement condition or event). Each ENI 103 is configured to, based at least partially on the rail vehicle data, transmit control or command signals, e.g., messages, along the trainline 102 network, or through another communication protocol/medium (e.g., over a wireless network), to sequentially or simultaneously deactivate all or specified train power supplies 205*a*-205*n*. Each rail vehicle's 101 data may be transmitted additionally or alternatively to any one of the plurality of on-board computers, e.g., HEUs 203*a*-203*n*, wherein the on-board computers are programmed or otherwise configured to sequentially or simultaneously deactivate all or specified train power supplies 205*a*-205*n* based at least partially on the rail vehicle data.

Figure 5:
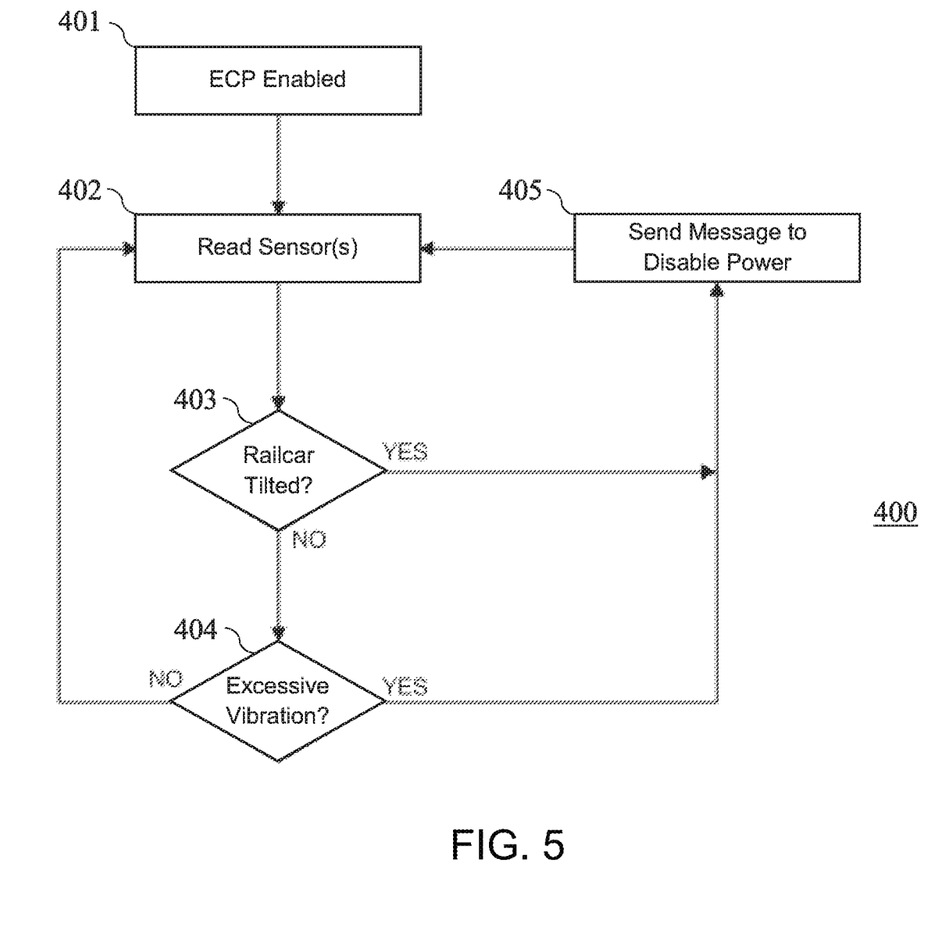
FIG. 5 is a flow diagram of one embodiment of a detection method for an ECP-enabled rail vehicle.

FIG. 5 illustrates an embodiment of a computer-implemented method 400 for vehicle control, e.g., for monitoring and responding to at least one rail vehicle's 101 derailment, for at least one ENI 103 (or local controller), on-board computer 203, EOT 206, or other like on-board computer, for a train. The exemplary configuration of FIG. 5 depicts an ENI 103 communicating with two example sensors, namely, a tilt sensor and an accelerometer, although additional or fewer sensors may be used. First, the ECP system is enabled (Step 401). Next, data is collected from or generated by the sensors 106 and communicated to the ENI 103 (Step 402). The ENI 103 then processes this information and determines if the rail vehicle 101 has tilted outside of some configurable value or threshold (Step 403). In response to determining that the train has tilted (i.e., reached a "trigger" threshold) (Step 403), the ENI 103 generates and sends a message or other control signal to disable the train's 201 power supply 205 (Step 405).

In response to determining that the rail vehicle 101 has not tilted (i.e., has not reached a "trigger" threshold), the ENI 103 next processes the information and determines if there is excessive vibration of the rail vehicle 101 (Step 404), in which excessive vibration is defined as vibration that may potentially cause a derailment, such as traveling at an unsafe speed for given rail conditions. In response to determining that there is excessive vibration (i.e., reached a "trigger" threshold) of the rail vehicle 101 (Step 404), the ENI 103 generates and sends a message or other control signal to disable the train's 201 power supply 205 (Step 405). In response to determining that there is not excessive vibration of the rail vehicle (Step 404), the ENI 103 reverts to receiving updates and sensor information and data readings from the sensors 106 (Step 402). If, having proceeded to Step 405, in which the power was disabled, the ENI 103 may optionally continue receiving updates and sensor information and data readings from the sensors 106 (Step 402) to determine if the sensed conditions have been resolved. Although rail vehicle tilt and vibration are used in this embodiment as examples of types of data that may indicate rail vehicle derailment, other types of sensor data may be employed instead or in addition. Additionally, the steps conducted by the ENI 103 or other like on-board computer may be centralized in a sensor unit 104 which reads the rail vehicle 101 data, processes the rail vehicle 101 data, and acts accordingly by either taking additional readings or transmitting an instruction to a power supply controller 204 to deactivate its power supply 205.

Figure 6:
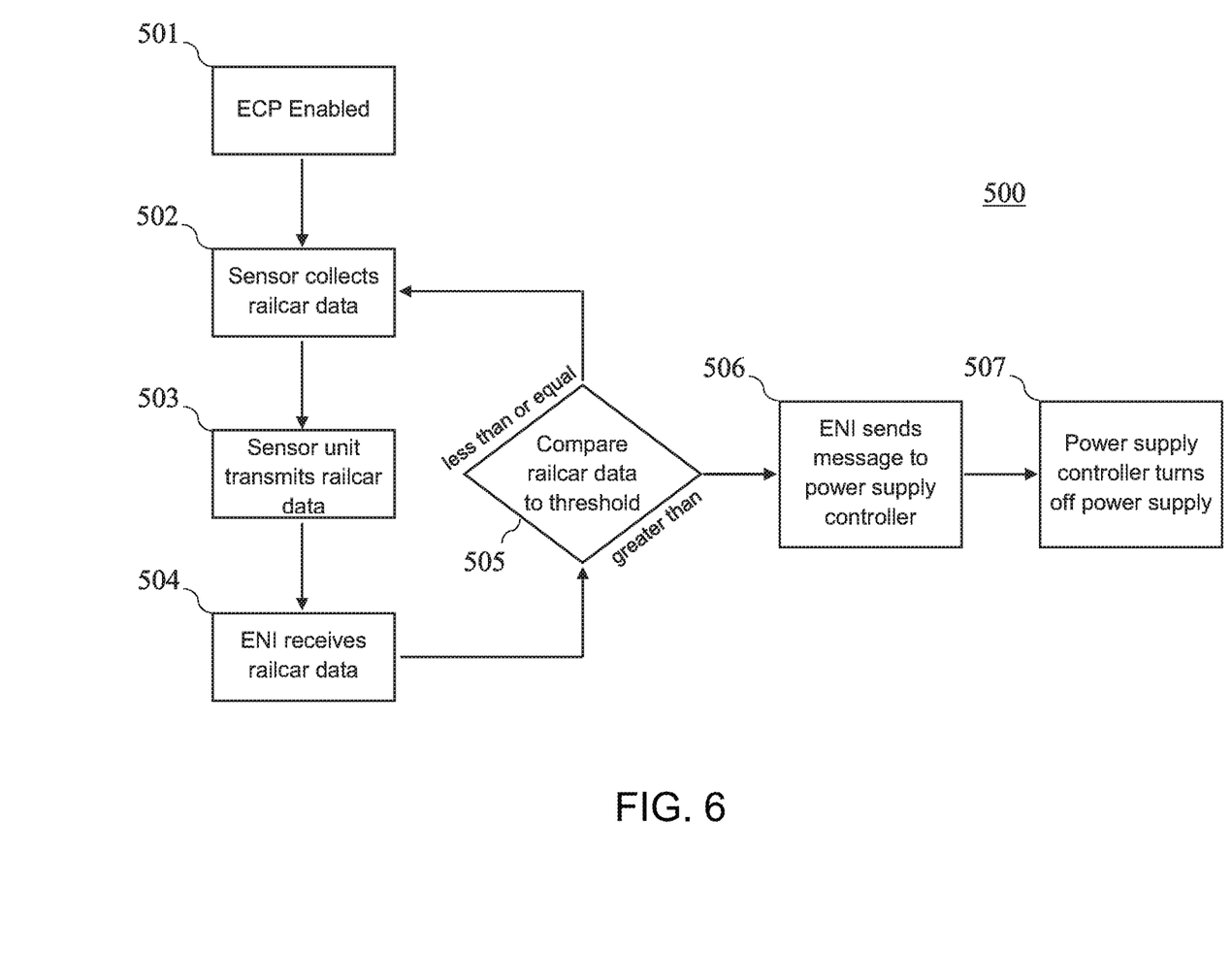
FIG. 6 is a flow diagram of one embodiment of a detection method for an ECP-enabled rail vehicle, implemented partly by an ECP network interface and a sensor unit.

FIG. 6 illustrates another embodiment of a computer-implemented method 500 for vehicle control, e.g., for monitoring and responding to at least one rail vehicle's 101 derailment for at least one ENI 103. First, the ECP system is enabled (Step 501). Next, rail vehicle 101 data is collected via at least one sensor 106 (Step 502), which may include a level of vibration, flexion, compression, speed, angular velocity, tilt, external temperature, and/or internal temperature, or any combination thereof (or any other data point that, when compared to a threshold, is indicative of a rail vehicle derailment). The data is then transmitted (Step 503), either directly from the sensor 106 or from the sensor unit 104 to the ENI 103, which receives the data (Step 504). The ENI 103 compares the rail vehicle 101 data to a threshold condition or parameter or other criteria (Step 505), which may be a preset value or dynamically-determined value based on other information about the rail vehicle 101, such as speed, track location, rail vehicle 101 location within the trainline, and the like. If the rail vehicle 101 data does not exceed the threshold, the ENI 103 proceeds to repeat the collection of rail vehicle 101 data (Step 502), data transmission and reception (Steps 503-504), and threshold comparison (Step 505). Alternatively, if the rail vehicle 101 data does exceed the threshold, the ENI 103 proceeds to Steps 506-507. In these steps, the ENI 103 sends at least one message or other control signal to at least one power supply controller 204 to deactivate at least one power supply 205 (Step 506), which causes the power supply 205 to deactivate (Step 507). The above steps carried out by the ENI 103 may be carried out by another on-board computer or other circuit.

Figure 7:
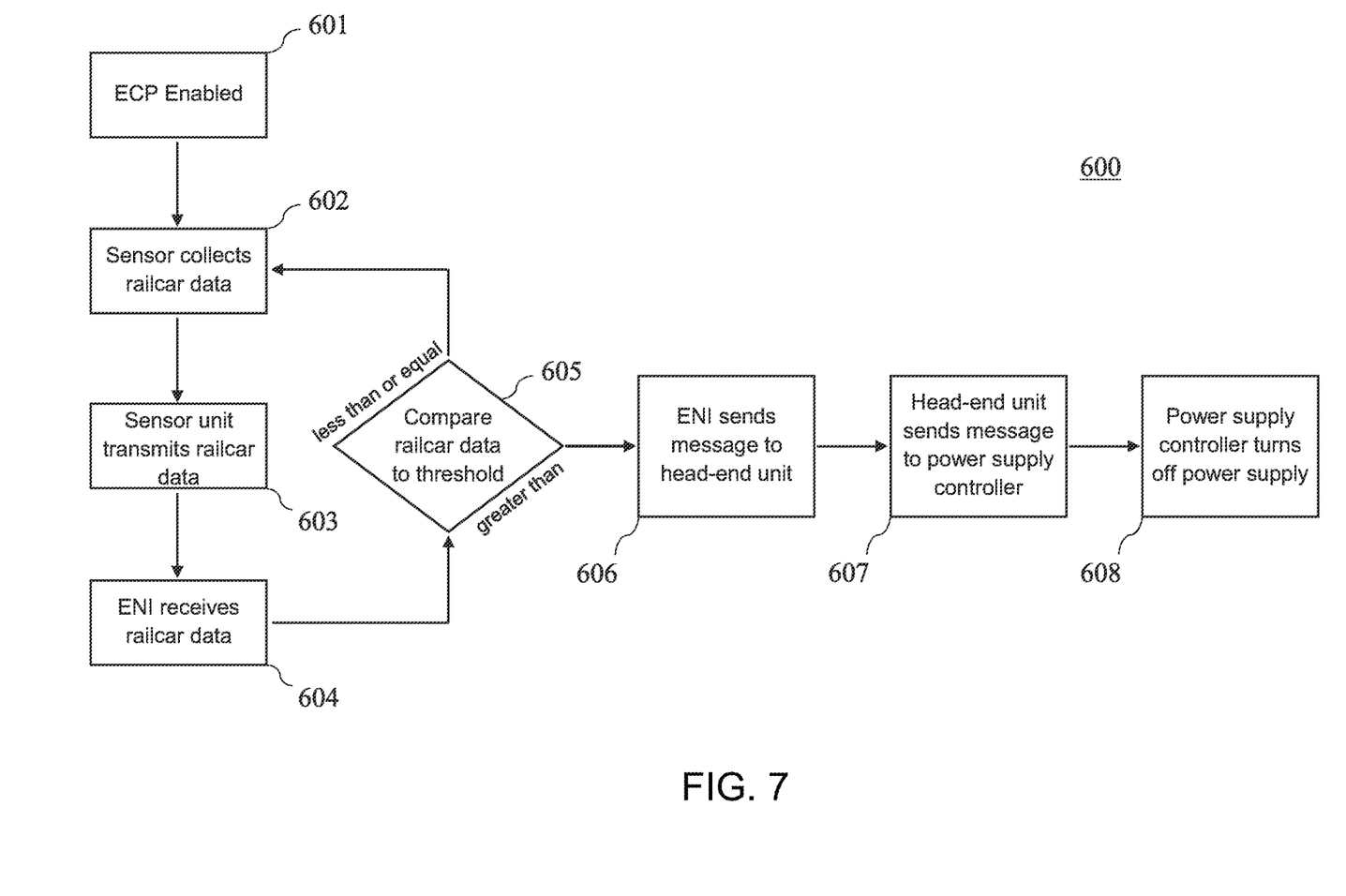
FIG. 7 is a flow diagram of one embodiment of a detection method for an ECP-enabled rail vehicle, implemented partly by an ECP network interface, an on-board computer or other controller (having one or more processors), and a sensor unit.

FIG. 7 illustrates another embodiment of a computer-implemented method 600 for vehicle control, e.g., for monitoring and responding to at least one rail vehicle's 101 derailment for at least one ENI 103 and on-board computer 203. First, the ECP system is enabled (Step 601). Next, rail vehicle 101 data is collected via at least one sensor 106 (Step 602), which may include a level of vibration, flexion, compression, speed, angular velocity, tilt, external temperature, and/or internal temperature, or any combination thereof (or any other data point that, when compared to a threshold, is indicative of a rail vehicle derailment). The data is then transmitted (Step 603), either directly from the sensor 106 or from the sensor unit 104 to the ENI 103, which receives the data (Step 604). The ENI 103 compares the rail vehicle 101 data to a threshold condition or parameter or other criteria (Step 605), which may be a preset value or dynamically-determined value based on other information about the rail vehicle 101, such as speed, track location, rail vehicle 101 location within the trainline, and the like. If the rail vehicle 101 data does not exceed the threshold, the ENI 103 proceeds to repeat the collection of rail vehicle 101 data (Step 602), data transmission and reception (Steps 603-604), and threshold comparison (Step 605). Alternatively, if the rail vehicle 101 data does exceed the threshold, the ENI 103 proceeds to Steps 606-608. In these steps, the ENI 103 sends at least one message or other control signal to the on-board computer 203 (Step 606), which in turn sends a message to the power supply controller 204 (Step 607), which causes the power supply 205 to deactivate (Step 608). The above steps carried out by the ENI 103 or on-board computer 203 may be carried out by another on-board computer or circuit.

Figure 8:
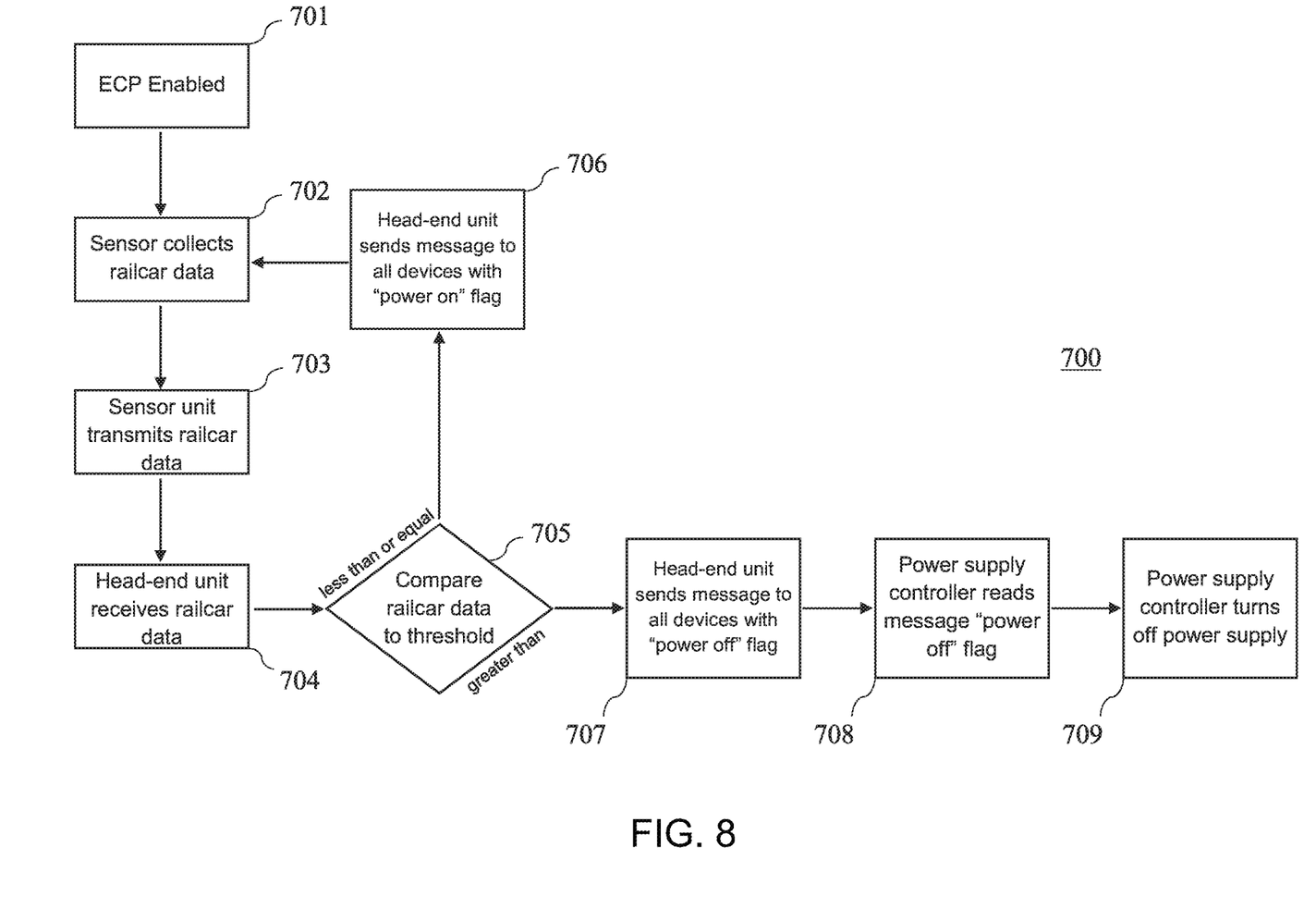
FIG. 8 is a flow diagram of one embodiment of a detection method for an ECP-enabled rail vehicle, implemented partly by an on-board computer and a sensor unit.

FIG. 8 illustrates another embodiment of a a computer-implemented method 700 for vehicle control, e.g., for monitoring and responding to at least one rail vehicle's 101 derailment for at least one on-board computer 203. First, the ECP system is enabled (Step 701). Next, rail vehicle 101 data is collected via a sensor 106 (Step 702), which may include a level of vibration, flexion, compression, speed, angular velocity, tilt, external temperature, and/or internal temperature of the rail vehicle 101, or any combination thereof (or any other data point that, when compared to a threshold or other designated criteria, is indicative of a rail vehicle derailment or other designated movement event or condition). The data is then transmitted (Step 703), either directly from the sensor 106 or from the sensor unit 104 to the on-board computer 203, which receives the data (Step 704). The on-board computer 203 compares the rail vehicle 101 data to a threshold condition or parameter or other criteria (Step 705), which may be a preset value or dynamically determined value based on other information about the rail vehicle 101, such as speed, track location, rail vehicle 101 location within the trainline, and the like. If the rail vehicle 101 data does not exceed the threshold, the on-board computer sends a message or other control signal to all on-board devices containing a "power on" flag, thereafter proceeding to repeat the collection of rail vehicle 101 data (Step 702), data transmission and reception (Steps 703-704), and threshold comparison (Step 705). Alternatively, if the rail vehicle 101 data does exceed the threshold, the on-board computer 203 proceeds to Steps 707-709. In these steps, the on-board computer sends a message or other control signal to all devices containing a "power off" flag (Step 707), which is read by the power supply controller 204 (Step 708), which in turn causes the power supply 205 to deactivate (Step 709). The above steps carried out by the on-board computer 203 may be carried out by another on-board computer or circuit.

In an embodiment, the on-board computer 203, ENI 103 (e.g., local controller), and/or EOT 206 are programmed or otherwise configured to automatically sense (and/or otherwise receive signals relating to) the type of material on the rail vehicle 101 and, based thereon, activate, deactivate, or otherwise implement at least one aspect of a vehicle control system as set forth herein. In another embodiment or aspect, the on-board computer 203, ENI 103 (e.g., local controller), and/or EOT 206 are configured to determine the type of material on the rail vehicle 101 through analyzing the rail vehicle data, a bill of lading, a manifest, or the like, and, based thereon, activate, deactivate, or otherwise implement at least one aspect of a vehicle control system as set forth herein. In another embodiment, the on-board computer 203, ENI 103 (e.g., local controller), and/or EOT 206 are configured to determine which rail vehicle 101 or group or set of rail vehicles 101 is carrying flammable cargo or other designated cargo, and, based thereon, activate, deactivate, or otherwise implement at least one aspect of a vehicle control system as set forth herein, and/or activate, deactivate, or otherwise implement at least one aspect of a vehicle control system as set forth herein for only that rail vehicle 101 or group or set of rail vehicles 101.

In another embodiment, the on-board computer 203, ENI 103 (e.g., local controller), and/or EOT 206 are configured to communicate over a wireless network (e.g., a radio network), such that the messages and commands or other control signals may be transmitted wirelessly in addition to the trainline transmission, as an alternative to the trainline transmission, or based upon some condition or parameter associated with the trainline 102. In another aspect, the rail vehicle data may include the sensing or determination of a break in the trainline 102, such as by the on-board computer 203, ENI 103 (e.g., local controller), and/or EOT 206 determining that trainline communication has been terminated, such as the trainline 102 severing due to the derailment of the rail vehicle 101. Accordingly, the rail vehicle data that is used to generate the messages or other control signals and cause the deactivation of the power supply 205 (such as through the power supply controller 204) may include a variety of parameters and conditions that would be indicative of a derailment, or a leakage of flammable cargo, or of another designated condition or occurrence. In another embodiment, the sensor unit 104 includes a processor 105 and/or sensor 106 that is programmed or otherwise configured to automatically sense or determine that, e.g., a leak has occurred (or that some other designated condition has occurred) by sensing the environmental or atmospheric conditions (e.g., physical conditions, chemical analysis, pH analysis, or the like) on or around the rail vehicle 101, and, e.g., deactivate a power supply based thereon (e.g., responsive to).

An embodiment relates to a control system, method, or apparatus for controlling an ECP-equipped train, which includes a sensor unit and an ECP network interface to monitor a condition or parameter associated with at least one rail vehicle and "turn off" or deactivate ECP power. In another embodiment, alternatively or additionally, a vehicle control system includes a sensor unit and an on-board computer, e.g., a head-end unit (HEU), to monitor a condition or parameter associated with at least one rail vehicle and "turn off" or deactivate ECP power. In another embodiment, alternatively or additionally, a vehicle control system includes a sensor unit, an ECP network interface, and an on-board computer to monitor a condition or parameter associated with at least one rail vehicle and "turn off" or deactivate ECP power.

Another embodiment relates to a control system for a train equipped with an ECP air brake system, where the train includes at least one locomotive and at least one other rail vehicle (e.g., tanker, boxcar, or other cargo-carrying rail vehicle/railcar) connected to a trainline network. The system includes at least one power supply and at least one power supply controller positioned on or associated with the train, wherein the power supply controller is programmed or otherwise configured to communicate over the trainline network and control the at least one power supply. The system further includes at least one local controller positioned on or associated with the at least one rail vehicle, wherein the local controller is configured to: (a) communicate over the trainline network; (b) receive or determine rail vehicle data comprising a condition or parameter associated with the at least one rail vehicle; and, (c) based at least partially on the rail vehicle data, generate at least one first message or other control signal to deactivate (e.g., cause the deactivation of) the at least one power supply.

In an embodiment, a control system for a vehicle system having at least one vehicle includes at least one sensor unit positioned on or associated with the at least one vehicle, including at least one sensor controller and at least one of the following: an accelerometer, a flex sensor, a pressure sensor, a gyro sensor, a tilt sensor, an ambient air temperature sensor, and/or a car payload temperature sensor, or any combination thereof. The at least one sensor unit is configured to monitor or sense at least one of the following attributes of the vehicle: vibration, flexion, compression, speed, angular velocity, tilt, external temperature, and/or internal temperature, or any combination thereof. The vehicle data associated with the at least one vehicle includes at least one of the following: a level of vibration, a level of flexion, a level of compression, a speed, a level of angular velocity, a level of tilt, a level of external temperature, and/or a level of internal temperature, or any combination thereof.

In an embodiment, the at least one local controller is further programmed or otherwise configured to: transmit the vehicle data to at least one on-board computer that is configured to display or cause to display the vehicle data to an operator; compare the vehicle data to a threshold condition or parameter or other criteria that is indicative of a designated vehicle movement condition (e.g., derailment); determine if the vehicle data surpasses the threshold condition or parameter or otherwise meets the criteria; and in response to determining that the rail vehicle data surpasses the threshold condition or parameter or otherwise meets the criteria, transmit, or cause to be transmitted, an alert to the vehicle operator.

In an embodiment, the at least one first message or other control signal is a message or other control signal to the at least one power supply controller to deactivate, or cause the deactivation of, the at least one power supply. In an embodiment, the system further includes at least one on-board computer configured to send at least one second message or other controls signal to the at least one power supply controller. The at least one power supply controller is further configured to: receive the at least one second message or other control signal; and, based at least partially on the at least one second message or other control signal, deactivate, or cause the deactivation of, the at least one power supply.

In an embodiment, the at least one first message or other control signal is a message or other control signal to the on-board computer to send a second message or other control signal to the at least one power supply controller to deactivate, or cause the deactivation of, the at least one power supply. In an embodiment, the at least one first message or other control signal is a plurality of messages or other control signals, the plurality of messages or other control signals comprising at least the following: (a) a message or other control signal to the on-board computer to send a second message or other control signal to the at least one power supply controller to deactivate, or cause the deactivation of, the at least one power supply; and (b) a message or other control signal to the at least one power supply controller to deactivate, or cause the deactivation of, the at least one power supply. In an embodiment, the at least one second message or other control signal includes at least a power state flag that represents either a powered-on state or a powered-off state, and the at least one power supply controller is further configured to deactivate, or cause the deactivation of, the at least one power supply based at least partially on the power state flag.

Another embodiment relates to a computer-implemented method for monitoring and responding to at least one rail vehicle's derailment, for a train equipped with an ECP air brake arrangement, wherein the train includes at least one locomotive and the at least one other rail vehicle connected to a trainline network. The method includes: (a) receiving rail vehicle data including a condition or parameter associated with the at least one rail vehicle; (b) comparing the rail vehicle data to a threshold condition or parameter or other criteria; (c) determining if the rail vehicle data surpasses the threshold condition or parameter or other criteria; and (d) in response to determining that the rail vehicle data surpasses the threshold condition or parameter or other criteria, transmitting at least one first message or other control signal to deactivate, or cause the deactivation of, at least one power supply positioned on or associated with the train (or any component thereof).

In an embodiment, the method further includes: (e) transmitting the rail vehicle data to at least one on-board computer that is configured to display or cause to display the rail vehicle data to a locomotive operator; and (f) in response to determining that the rail vehicle data surpasses the threshold condition or parameter or otherwise meets designated criteria, transmitting, or causing to be transmitted, an alert to the locomotive operator.

In an embodiment, the method further includes repeating steps (a), (b), and (c) until determining that the rail vehicle data surpasses the threshold condition or parameter (or otherwise meets designated criteria). In an embodiment, the at least one first message or other control signal is a message or other control signal to at least one power supply controller to deactivate, or cause the deactivation of, the at least one power supply. In an embodiment, the method further includes sending periodic messages (or other signals) to at least one power supply controller, wherein the at least one first message or other control signal triggers the transmission of a new message (or other control signal) to the at least one power supply controller, and the at least one power supply controller is configured to deactivate, or cause the deactivation of, the at least one power supply based at least partially on the new message (or other control signal).

In an embodiment, the method further includes sending periodic messages (or other signals) to at least one power supply controller. The at least one first message or other control signal includes a plurality of messages (or other signals), with the plurality of messages (or other signals) including at least the following: (a) a message (or other signal) to send a new message (or other signal) to the at least one power supply controller, wherein the at least one power supply controller is configured to deactivate, or cause the deactivation of, the at least one power supply based at least partially on the new message (or other signal); and (b) a message (or other signal) to the at least one power supply controller to deactivate, or cause the deactivation of, the at least one power supply.

In an embodiment, the periodic messages (or other signals) include at least a power state flag that represents either a powered-on state or a powered-off state. The new message (or other signal) includes at least a new power state flag being set to represent a powered-off state, and the at least one power supply controller is configured to deactivate, or cause the deactivation of, the at least one power supply based at least partially on the new power state flag.

In another embodiment or aspect, provided is a computer program product that includes at least one non-transitory computer-readable medium including program instructions that, when executed by at least one processor, causes the at least one processor to execute a series of steps. These steps include: receiving vehicle data comprising a condition or parameter associated with at least one vehicle of a vehicle system; comparing the vehicle data to a threshold condition or parameter or other designated criteria; determining if the vehicle data meets the criteria, e.g., surpasses the threshold condition or parameter; and, in response to determining that the vehicle data meets the criteria, transmitting at least one first control signal to deactivate (e.g., cause the deactivation of) at least one power supply positioned on or associated with the vehicle system. In an embodiment, the program instructions are further configured to cause the at least one processor to display or cause to display the vehicle data to an operator, and in response to determining that the vehicle data meets the criteria, transmit (e.g., cause to be transmitted) an alert or other notification to the operator.

In an embodiment, the program instructions are further configured for the at least one processor to repeatedly receive new vehicle data comprising a condition or parameter associated with the at least one vehicle of the vehicle system, compare the new vehicle data to the designated criteria, and determine if the new vehicle data meets the criteria until determining that the new vehicle data meets the criteria (or until the vehicle is powered down). In an embodiment, the at least one first control signal is a control signal to at least one power supply controller to deactivate the at least one power supply. In an embodiment, the program instructions are further configured to cause the at least one processor to send periodic control signals to at least one power supply controller, wherein the at least one first control signal triggers the transmission of a new control signal to the at least one power supply controller. The at least one power supply controller is configured to deactivate the at least one power supply based at least partially on the new control signal.

In an embodiment, the program instructions are further configured to cause the at least one processor to send periodic messages or other control signals to at least one power supply controller. The at least one first control signal is a plurality of control signals, and the plurality of control signals include at least the following: (a) a control signal to send a new control signal to the at least one power supply controller, wherein the at least one power supply controller is configured to deactivate the at least one power supply based at least partially on the new control signal; and (b) a control signal to the at least one power supply controller to deactivate the at least one power supply. In an embodiment, the periodic control signals include at least a power state flag that represents either a powered-on state or a powered-off state. The new control signal includes at least a new power state flag being set to represent a powered-off state, and the at least one power supply controller is configured to deactivate the at least one power supply based at least partially on the new power state flag.

In an embodiment, a vehicle control system (e.g., as set forth herein) is alternatively or additionally configured for automatically deactivating one or more power supplies of a vehicle system (e.g., the power supplies may be part of an ECP or other braking system of the vehicle system, or may otherwise be respectively located on board plural vehicles of the vehicle system) responsive to receipt or absence of a signal that is at least partially generated or removed, respectively, based on off-board data or conditions, e.g., a signal of a positive train/vehicle control (PTC) or other off-board (i.e., at least partially off-board) vehicle control system (where vehicles of a transportation network are configured so they cannot proceed along a route in the presence or absence of such signals, as applicable depending on the particular configuration of the transportation network and control system).

In embodiments, control signals for deactivating one or more power supplies are transmitted along a conductor, e.g., along a trainline that extends between plural vehicles of a rail vehicle consist. In other embodiments, control signals for deactivating one or more power supplies are alternatively or additionally transmitted wirelessly. In one example, a vehicle control system is configured to interface with a wireless distributed power communication system of a vehicle system (i.e., a communication system used for coordinated braking and throttle control of plural propulsion-generating vehicles in a consist) to wirelessly transmit such control signals between vehicles. Control signals may also be communicated over MU (locomotive multiple unit) cables, over Ethernet or other IP or other computer networks (e.g., that interconnect vehicles for network communication and control purposes), using radios or wireless communication units other than those used by a distributed power system, using signals propagated as varying fluid pressure along a brake line, and so on.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle control system comprising:
   at least one sensor on board a vehicle system and configured to generate vehicle data relating to a condition or parameter associated with the vehicle system; and
   a power supply control system having at least one processor and configured to control one or more power supplies on board the vehicle system and to receive the vehicle data from the at least one sensor;
   wherein the power supply control system is further configured to compare the vehicle data to one or more criteria relating to vehicle movement, and, in response to (i) a determination that the vehicle data meets the one or more criteria and (ii) receipt of a signal indicative of the vehicle system carrying or being configured to carry cargo of a predetermined material, generate a control signal to deactivate at least one power supply of the one or more power supplies.

2. The vehicle control system of claim 1, wherein the power supply control system is configured to generate the control signal responsive to both the receipt of the signal indicative of the vehicle system carrying the cargo of the predetermined material and a concurrent determination that the vehicle data meets the criteria.

3. The vehicle control system of claim 2, wherein the vehicle system is a rail vehicle system having an electronically controlled pneumatic (ECP) air brake system, the at least one power supply is an ECP power supply of the ECP air brake system, and the one or more criteria are indicative of derailment of the rail vehicle system.

4. The vehicle control system of claim 3, wherein the rail vehicle system comprises plural rail vehicles, the ECP air brake system includes a trainline interconnecting the plural rail vehicles and configured for both communications and supplying electrical power from the ECP power supply, the power supply control system is located on board a first one of the rail vehicles and the ECP power supply is located on board a different, second one of the rail vehicles, and the power supply control system is configured to communicate the control signal that is generated over the trainline to deactivate the ECP power supply.

5. The vehicle control system of claim 2, wherein the vehicle system comprises an on-road vehicle, and the one or more criteria are indicative of the on-road vehicle at least one of decelerating by more than a deceleration threshold or a horizontal axis of the on-road vehicle changing by more than a designated orientation threshold relative to a support surface of the on-road vehicle.

6. The vehicle control system of claim 2, wherein the vehicle system includes plural vehicles, the at least one sensor comprises plural sensors respectively disposed on board the plural vehicles, the power supply controller is configured to compare the vehicle data from each of the vehicles to the one or more criteria and to generate the control signal responsive to the vehicle data from any of the vehicles meeting the one or more criteria.

7. The vehicle control system of claim 2, wherein the one or more criteria relating to vehicle movement are indicative of a vehicle accident.

8. The vehicle control system of claim 2, further comprising a cargo sensor configured to generate the signal indicative of the vehicle system carrying the cargo of the predetermined material.

9. The vehicle control system of claim 2, further comprising an electronic data storage device electrically coupled to the power supply control system, the data storage device configured to store data relating to cargo carried by the vehicle system and to generate the signal indicative of the vehicle system carrying the cargo of the predetermined material.

10. The vehicle control system of claim 2, wherein the one or more criteria relating to vehicle movement include one or more of a level of vibration, a level of flexion, a level of compression, a level of angular velocity, or a level of tilt.

11. The vehicle control system of claim 2, wherein the one or more criteria include plural criteria, and the power supply control system is configured to compare the vehicle data to the plural criteria, and to generate the control signal responsive to the determination that the vehicle data meets the plural criteria and the receipt of the signal indicative of the vehicle system carrying the cargo of the predetermined material.

12. A vehicle control system comprising:
   plural sensors respectively on board plural vehicles of a vehicle system and configured to generate vehicle data relating to conditions or parameters associated with the plural vehicles; and
   a power supply control system having at least one processor and configured to control plural power supplies respectively on board the plural vehicles and to receive the vehicle data from the sensors;
   wherein the power supply control system is further configured to compare the vehicle data to one or more criteria relating to vehicle movement, and, responsive to a determination that the vehicle data of a first vehicle of the plural vehicles meets the criteria and that any of the vehicles is one or more of carrying cargo of predetermined material or is configured to carry the cargo of the predetermined material, generate a control signal to deactivate at least one of the power supplies on board a second vehicle of the plural vehicles.

13. The vehicle control system of claim 12, wherein the power supply control system is configured to generate the control signal to deactivate all the plural power supplies.

14. The vehicle control system of claim 12, wherein the power supply control system is configured to generate the control signal responsive to (i) the determination that the vehicle data of the first vehicle of the plural vehicles meets the criteria and (ii) receipt of a signal indicative of the second vehicle of the vehicle system carrying the cargo of the predetermined material.

15. The vehicle control system of claim 14, further comprising a respective cargo sensor on board each vehicle of two or more of the plural vehicles and configured to generate the signal indicative of the vehicle carrying the cargo of the predetermined material.

16. The vehicle control system of claim 12, further comprising an electronic data storage device electrically coupled to the power supply control system, the data storage device configured to store data relating to the cargo carried by the vehicle system and to generate the signal indicative of the any of the plural vehicles of the vehicle system carrying the cargo of the predetermined material.

17. The vehicle control system of claim 12, wherein the one or more criteria include plural criteria, and the power supply control system is configured to compare the vehicle data to the plural criteria, and to generate the control signal responsive to the determination that the vehicle data of the first vehicle meets the plural criteria.

18. The vehicle control system of claim 12, wherein the one or more criteria include plural criteria, and the power supply control system is configured to compare the vehicle data to the plural criteria, and to generate the control signal to deactivate all the power supplies responsive to a determination that the vehicle data of any of the plural vehicles meets the plural criteria.

19. A vehicle control system comprising:
  at least one power supply positioned on board a vehicle system that is configured to provide electrical power over a bus that interconnects plural vehicles of the vehicle system;
  at least one power supply controller positioned on board the vehicle system and configured to control the at least one power supply; and
  at least one local controller positioned on board one or more of the plural vehicles and configured to: communicate over the bus; receive or determine vehicle data comprising a condition or parameter associated with the one or more of the plural vehicles; compare the vehicle data to one or more criteria relating to vehicle movement; and, responsive to the vehicle data meeting the one or more criteria and receipt of a first signal indicative of at least one of the vehicles carrying or being configured to carry cargo of a predetermined material, transmit a second signal to the at least one power supply controller for the at least one power supply controller to deactivate the electrical power supplied to one or more of the vehicles from the at least one power supply.

20. The vehicle control system of claim 19, wherein the vehicle system comprises a rail vehicle system, the at least one power supply is configured to transmit the electrical power for powering electronically controlled pneumatic (ECP) air brakes of the plural vehicles of the rail vehicle system, and the one or more criteria relate to rail vehicle derailment.

* * * * *